United States Patent [19]

Spencer

[11] Patent Number: 5,324,389

[45] Date of Patent: Jun. 28, 1994

[54] WASTE PAPER DISINTEGRATION, CLASSIFICATION AND PULPING SYSTEM

[75] Inventor: Mark W. Spencer, Springboro, Ohio

[73] Assignee: The Black Clawson Company, Middletown, Ohio

[21] Appl. No.: 901,532

[22] Filed: Jun. 19, 1992

[51] Int. Cl.$^5$ .............................................. D21B 1/08
[52] U.S. Cl. .......................................... 162/4; 162/55; 241/79.2
[58] Field of Search ................ 241/16, 38, 79.1, 79.2, 241/24; 162/4, 55, 57

[56] References Cited

U.S. PATENT DOCUMENTS

| | | | |
|---|---|---|---|
| 501,898 | 7/1893 | Schupp | 209/298 |
| 1,310,628 | 7/1919 | Murphy et al. | 241/79.1 |
| 2,943,800 | 7/1960 | Wultsch . | |
| 3,554,454 | 1/1971 | Gruendler . | |
| 3,741,863 | 6/1973 | Brooks | 162/4 |
| 3,804,340 | 4/1974 | Ekman et al. | 241/28 |
| 4,017,033 | 4/1977 | Tra . | |
| 4,123,489 | 10/1978 | Kelley | 162/4 |
| 4,160,722 | 7/1979 | Marsh | 162/4 |
| 4,194,968 | 3/1980 | Pfalzer et al. . | |
| 4,236,676 | 12/1980 | Bialski et al. . | |
| 4,382,559 | 5/1983 | Hellberg . | |
| 4,385,997 | 5/1983 | Stradal . | |
| 4,405,450 | 9/1983 | Selder . | |
| 4,465,591 | 8/1984 | Holz et al. . | |
| 4,500,040 | 2/1985 | Steffens . | |
| 4,538,767 | 9/1985 | Pimley | 241/79.3 |
| 4,566,942 | 1/1986 | Holz et al. . | |
| 4,592,513 | 6/1986 | Musselman | 241/69 |
| 4,615,492 | 10/1986 | Downie . | |
| 4,622,099 | 11/1986 | Eelman . | |
| 4,641,790 | 2/1987 | Musselman | 162/4 |
| 4,650,125 | 3/1987 | Pellhammer . | |
| 4,687,146 | 8/1987 | Sundman . | |
| 4,816,117 | 3/1989 | Pfalzer et al. . | |
| 4,848,674 | 7/1989 | Hunter . | |
| 4,919,796 | 4/1990 | Vikio | 241/79.1 |
| 5,094,715 | 3/1992 | Ljokkoi et al. . | |

OTHER PUBLICATIONS

Continuous Drum Repulping System Features High--Consistency Stock, Badawi et al, "Continuous Drum Repulping" pp. 107–108 (Date Unknown).

Primary Examiner—W. Gary Jones
Assistant Examiner—Brenda Lamb
Attorney, Agent, or Firm—Biebel & French

[57] ABSTRACT

A method of pulping baled waste material includes breaking up the bale and applying the broken bale to a fluffer or shredder to form a fluffed waste paper product containing heavy and light contaminants. This product is applied to an air separator from which heavier non-paper contaminant fraction is removed, and the remaining product is applied to the inlet of a vortex separator which removes a light reject fraction. A second accepts fraction is then water soaked and applied to the inlet of a series of drum-type pulpers. The invention further includes a drum-type pulper in which an axial shaft has radially-extending arms or buckets which dip into a pool of stock from waste paper in which the buckets sweep the interior of the drum, lift a quantity of the mixture from the pool, and allow the same to drop back into the pool. Vanes on the buckets cause the mixture to move axially in the drum from an inlet to an outlet.

3 Claims, 4 Drawing Sheets

WASTE PAPER DISINTEGRATION, CLASSIFICATION AND PULPING SYSTEM

BACKGROUND OF THE INVENTION

This invention relates to systems and apparatus for the repulping of waste paper, particular waste paper delivered in bales.

Waste paper for recycling purposes is commonly received by the paper mill in bales, and these bales of waste paper always contain contaminating or tramp materials. It has been observed that both the quantity and the difficulty of the contamination have been increasing over the years.

Bale contamination generally includes everything that must be removed from the waste paper itself, to make the paper fibers reusable. The contamination includes objects which are foreign to the waste paper itself, such as junk, glass, rocks, staples, paper clips, styrofoam cups, packing and the like. The waste paper also includes contaminates which are bonded to or are an integral part of the paper product to be reclaimed. These include plastic films and coatings, sizing clays and printing inks.

The bales themselves may be as large as 6' feet by 4' by 4' and may weight up to 4,000 pounds. When bales are picked up and loaded by fork lift trucks, it is not uncommon for the forks to pick up some asphaltic mix or pavement on which the bales may be resting, and then the asphalt becomes entrained with the baled material.

The tramp or trash material which is extraneous to the paper products being reclaimed may be either heavier or lighter than the paper products themselves. Thus, the heavier material, known in the industry as "heavies" including rocks, glass, and metal parts, is often (but not always) separated in gravitational traps which form a part of the repulping apparatus. The lighter products, which may include extraneous tramp material in the form of cellulose, pieces of wood, styrofoam, as well as plastic material bonded to the desirable paper fibers, are generally dumped or carried into the repulper apparatus without specific attempts at prior removal or separation.

The repulper itself has the job of separating the reusable fibers from those rubber-like and plastic parts to which many of the fibers are attached. Such plastic contaminates are known in the trade as "stickies". As previously mentioned, very little effort has been made to remove the non-attached or non-associated lighter trash. This, too, ends up in the pulper not only contaminating the pulper and impeding its proper operation, but often becoming entrained with the paper fibers, and reduced in size so that the trash becomes part of the accepts. This is a particular problem with frangible plastic materials, such as styrofoam. While styrofoam, itself, is very light in weight, it can be hydraulically pulled into the pulper and broken into small pieces. It then appears in the paper stock as an extremely hard to remove contaminate.

In the handling of baled waste paper, the bales themselves are frequently dumped directly into the pulping apparatus or are broken up first and then dumped into the pulper. This practice presents to the pulper an extraneous load of trash material that adversely affects the consistency of the stock, after wetting, and impairs the operation of the pulper. Sometimes the bales or broken bales, are presoaked without first removing the contaminants as mentioned, and then applied to the pulper.

Drum-type pulpers have come into widespread use for the purpose of defibering and reclaiming fibers from waste paper, due to the ability of a drum-type pulper to provide a uniform retention or residency and due to its ability to break up the fiber adhesion without disintegrating or breaking up the unwanted substances, such as the plastic film and stickies mentioned above.

In some systems, broken bales are applied directly into the interior of a drum-type pulper without pre-cleaning or pre-sorting. One such system that has been so operated is the "Fiberflow" repulping system of A. Ahlstrom Osakeyhtio of Noormarkku, Finland, which uses a drum-type defibrator as shown in U.S. Pat. No. 4,687,146 issued Aug. 18, 1987 and U.S. Pat. No. 5,094,715 issued Mar. 10, 1982. As described in the latter patent, a primary difficulty has been that of the bale wires, etc., which adversely interfere with the defibration and with the operation of the pulper, including blocking of the pulp screens.

Further, most drum-type pulpers in use are of the rotating drum variety in which the cylindrical walls of the drum are rotated about an imaginary center axis, and the contained material is elevated by vanes on the drum interior wall and allowed to drop gravitationally back into a pool of such material within the drum, as maintained by a weir or a dam. Such drum pulpers include not only the previously mentioned patents, but also U.S. Pat. Nos. 4,385,997 issued May 31, 1983 and 4,382,559 issued May 10, 1983. Rotating drum pulpers require large and bulky roller systems by which they are supported and driven. They also require high power to operate since almost the entire content is lifted at one time.

Pre-sorting of the broken bales has been suggested for the purpose of removing undesirable fragments prior to pulping. Pre-sorting is generally accomplished in a wetted or water environment, such as shown by the apparatus in U.S. Pat. Nos. 4,194,986 issued Mar. 25, 1980 and 4,650,125 issued Mar. 17, 1987. Wet pre-sorting is generally undesirable, in part because off its use of water which must eventually be removed from the reject material, and in part by reason of its tendency to break up the stickies and plastic non-pulpable components so that they become more difficult to separate from the paper fiber.

A need therefore exists for a pulping system in which bales are disintegrated and then pre-sorted by air classification processes employing relatively inexpensive and efficient handling apparatus, and which remove both the heavies and the light weight fraction. There is a further need for improved lower cost drum-type pulpers which may be modularized and connected together in segments to provide for the desired defibering capacity for pre-sorted waste paper material.

SUMMARY OF THE INVENTION

This invention is directed to method and apparatus for the pulping of baled waste paper, in which an initial dry air classification effectively removes the non-pulpable heavies and a substantial portion of light weight contaminants from the baled waste paper product and delivers the remaining fibers to wet pulping apparatus, essentially free of heavy contaminates as well as much of the separated light weight contaminates.

In the practice of the preferred embodiment, a bale breaker is employed by which the bales and bale wires are broken and the baled components separated. The broken bales are delivered by a conveyor to a shredder or fluffer, by means of which the broken bale product is separated and reduced in size for handling.

The disintegrated baled components are delivered to an air classifier in which the non-pulpable heavies are collected and removed from flow stream. The remaining accepts fraction, including the light weight trash component, is then delivered by a material handling fan to an air separator cyclone in which the light reject fraction is removed. The cyclone then supplies a second accepts fraction which is substantially free of entrained heavies, as well as the light fraction. The heavy materials particularly include the bale wire which has always proved troublesome in the processing of pulp. The second accepts fraction is also substantially free of the light weight component which can contaminate the pulp, particularly including products such as styrofoam. This second accepts fraction, which may still include a substantial portion of stickies, is then wetted to a consistency of about 8% to 15% by soaking, and applied by a pump to a pulper.

The invention further utilizes an improved segmented drum-type pulper system. A plurality of pulping drums or cylinders are positioned in series-flow relation, and preferably are stacked one above the other so that when the pulp is applied to the drum pulper at the highest elevation, the pulp progresses through the drum pulper to a second drum pulper at a lower elevation, and so on, until it is removed from the pulper systems.

By using a system of stacked drum-type pulpers, the overall length of any one pulper drum or cylinder may be substantially reduced as compared to single drum pulpers of the kind previously noted in the background section of this application. Also, the pulping drums can be tailored to use less energy and substantially less floor space, and the movement of the pulp from one pulping drum to the next is primarily gravitational.

A particular aspect of the invention comprises the provision of a novel drum-type pulper. The pulper is provided with a cylindrical body which is substantially closed at the ends, and having means defining an inlet for the admission of a shredded and wetted paper mixture for pulping at one end, and an outlet at the opposite end. The drum pulper is of the kind which has a stationary drum with an axial shaft extending therethrough. A plurality of individual buckets are fixed to the shaft and extend radially thereof for rotation with the shaft. The outer ends of the buckets terminate in close proximity to an inside surface of the cylindrical body to sweep the drum interior when the shaft is rotated.

Each of the pulper drums includes means by which a liquid level or a pool of wetted material to be pulped is maintained therein. As the shaft rotates, the buckets dip into the pool and lift a quantity thereof upwardly, which is then discharged gravitationally and falls back into the pool. A gentle pulping action is thus provided. The buckets themselves or guide vanes on the buckets, may be set at a slight pitch angle with respect to the axis of the shaft so that, as the shaft rotates, the buckets tend to urge the material in the pool from the inlet end toward the outlet end. Alternatively, the buckets may be aligned longitudinally at progressing angular positions to simulate a "wave" or the threads of an Archimedes screw, to assist in moving the stock along from the inlet toward the outlet.

A plurality of such pulping drums are mounted on a support frame, so that at least some of the drums are located at a higher elevation than the other drums, and the outlets of an upper drum is connected to an inlet of a lower drum. The material to be pulped is applied to the inlets of the uppermost drum or drums and then flows gravitationally from one drum to the next until the outlet end of the lowermost drum is reached, at which point the pulp may then be delivered to a separator screen.

It is accordingly an important object of this invention to provide a system and method, as outlined above, for the pulping of baled waste paper in which heavy and light contaminates are removed by dry air separation prior to pulping.

A further object of the invention is the provision of a system by which bales are shredded and applied to a first separator for removing heavier non-paper or non-pulpable fiber contaminates and thereby forming a first accept fraction, applying the first accepts fraction to a second separator and removing therefrom a light reject fraction and forming a second accepts fraction which is essentially free of heavy contaminates and lighter non-paper contaminates and thereafter soaking the second accepts fraction and applying the same to a pulper for separating the paper fiber component from the non-fiber component.

A more particular object of the invention is the provision of an improved drum-type pulper and separator in which a plurality of individual pulper drum units are connected in tandem or in series, and in which rotating arms or buckets are carried on a shaft within a cylindrical housing by which the pulp is gently defibered and disassociated from bound stickies and other contaminates.

Another object of the invention is the provision of a drum-type pulper in which a plurality of individual pulping drums, with rotating buckets or the like, are connected in series, with one elevationally below the other so that the partially processed pulp from one such drum segment is gravitationally fed to a lower drum segment.

A still further object of the invention is the provision of a drum-type pulper as outlined above in which a rotating shaft carries a plurality of individual bucket-like arms by which the stock is lifted and dropped back into a pool of stock.

These and other objects and advantages of the invention will be apparent from the following description, the accompanying drawings and the appended claims.

DESCRIPTION OF THE PREFERRED EMBODIMENT

Figure 1:
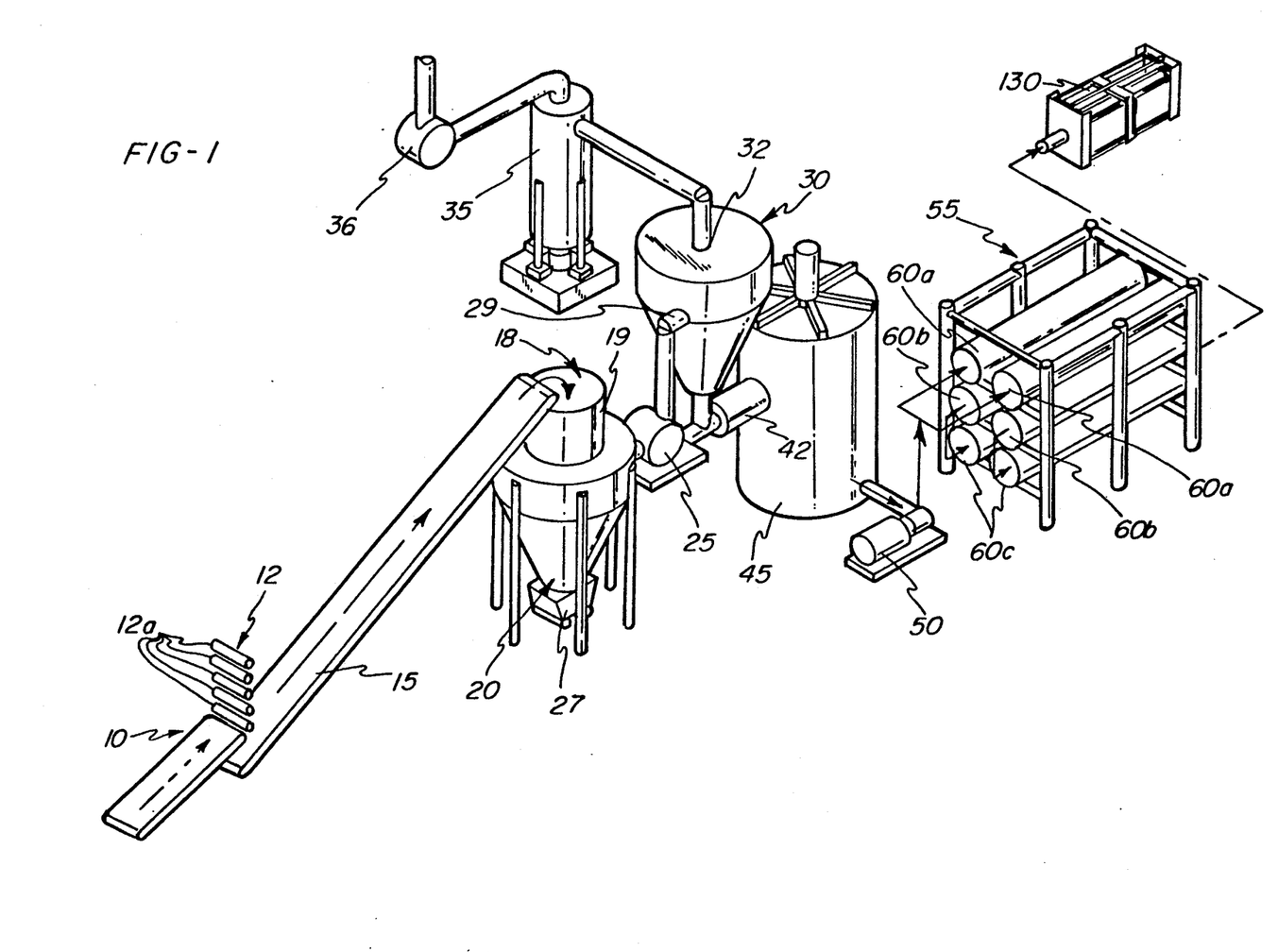
FIG. 1 is a perspective view of a baled waste paper processing and pulping system in accordance with this invention.

Referring to the figures of the drawing, which illustrate a preferred embodiment of the invention, the pulping system illustrated in FIG. 1 includes an up ramp 10 for carrying a bale 11 (FIG. 2) to the inlet of a multiple pin roll bale breaker 12. The bale breaker 12 is of the kind in which a plurality of individual rolls 12a are motor or chain driven, and set in a housing one above the other at an angle to the vertical. The rolls are provided with radially extending pins or breakers (not shown) which engage the side of a bale and literally tear the bale apart into pieces which then drop through the spaces between the rolls. A bale breaker suitable for use as the bale breaker 12 of this invention is sold as Model 48A-19 by Materials Processing, Inc. of P.O. Box 638, Oconomowoc, Wis. 53066.

An inclined conveyor 15 (FIG. 1) carries the broken bale pieces from the breaker 12 to the inlet of a fluffer 18. The fluffer may consist of a generally horizontally oriented disk 18a mounted on a vertical shaft with upwardly extending teeth, and rotating in a housing 19. The broken bale chunks are broken apart upon contact with the teeth of the rotating disk of the fluffer 18 and are somewhat reduced to smaller acceptable-sized pieces. These pieces, however, contain the tramp and contaminate material of the bale, including baling wire. The fluffer is not intended to shred the baled product in the sense of reducing the product to a uniformly small size, although some cutting and size reduction is involved. It is desired to break apart the larger chunks and free up the non-bound and non-integral heavy and light weight components so that they may be classified and separated from the body of paper fiber-containing waste paper product.

The fluffed baled material falls gravitationally through the fluffer conduit housing 19 in the circumferential space surrounding the fluffer disc 18a and into a sorter or classifier described below. A suitable fluffer consists of the Model 6OR2OHP manufactured by Material Processing, Inc. The fluffer 18 operates to receive the broken bails of waste paper from the breaker 12, and opens up the bundles of waste paper accompanied by some shredding and size reduction. The fluffed bale material continues to contain the original contaminates and impurities.

The output content of the fluffer is directed into the top of a sorter or air classifier 20. The classifier 20, as shown, may constitute a reverse cyclone, and operates to separate the shredded waste product from the fluffer into a heavy non-fiber and non-pulpable reject fraction and a first accepts fraction. The air classifier 20, as shown, has a tangentially directed outlet 22 at the top of the conical body. An industrial material handling blower fan 25 has its inlet connected to the tangential outlet 22, to draw the first accepts fraction therethrough. The heavier particles fall through the conical body to an adjustable outlet gate 26 at the bottom. The size of the gate may be adjusted to control the rate of airflow therethrough, the remaining air being drawn down axially through the fluffer 18. The heavy rejects are dumped through the gate 26 into transport means such as the cart 27, for suitable disposal.

At this point, the heavies have been gravitationally separated from the fluffed or shredded input material, to the extent that the heavies have been disassociated from or were not originally an integral part of the baled material. This includes primarily and importantly the baling wire and any heavy trash component including but not limited to rocks, glass, paper clips, asphalt chunks, printer ribbon cases and heavier plastic components, to name a few.

The lighter fraction including the lighter trash, such as polystyrene foam, as well as the plastic laminates and pulpable paper is carried through the classifier 20 and out the tangential outlet 22, by the material handling fan 25 which creates a negative pressure within the cyclone air classifier 20. The first accepts fraction, still including substantial light weight contaminates, is delivered by the fan 25 to the tangential inlet 29 of a second air classifier cyclone 30. The air classifier cyclone 30 is also a cone type vortex centrifugal separator. The inlet 29 is tangential to the conical body, at the top, to set up a swirling flow therein in which the lighter particles become concentrated toward the center of the cone and are withdrawn through a center upper rejects outlet 32 to a filter 35. The filter 35 is conventional and removes the particles from the airstream which are then collected in an enclosed disposal container 35a. The filtered air is then discharged through an air balance blower 36.

The light reject fraction is thus separated from the first accepts fraction and collected in the filter 35, while a second accepts fraction is collected through the bottom outlet 40 of the separator or cyclone 30. This second accepts fraction has been air classified by the removal of both the heavies as well as the light fraction component of the original baled material. Thus, this product is now ready for further processing which includes the application to the inlet of a screw type wetting conveyor 42 which dampens the second accepts fraction and delivers it to a mixing or soaking tank 45.

The tank 45 has a motor driven vertical shaft 45a and a plurality of relatively slow turning mixer blades or paddles 46 which thoroughly mix and saturate the paper fiber component of the second accepts fraction, thereby forming an accepts and water mixture, ready for pulping. The speed of operation of the mixer 45 is relatively slow in terms of not more than about thirty revolutions per minute or less, in order merely to provide for thorough saturation and soaking of the fiber or pulp component without any substantial size reduction and without any substantial attempt to defiber or disassociate the fibers from their matrix.

The consistency of the wetted pulp mixture in the soaking tank 45 may be in the order of approximately 8 to 15%, and is withdrawn therefrom by a pulp pump 50 for deliver to a drum-type pulper system or assembly 55. The pump 50 may be a Midcon pump as manufactured by the Shartle Division, The Black Clawson Company, Middletown, Ohio.

The drum-type pulper assembly 55 comprises a plurality of individual cylindrical pulping drums 60 mounted on a common support frame 62. The drums 60 are connected in series relation so that the uppermost drum delivers its contents to a pulper drum which is lower in elevation, thereby taking advantage of gravitational feed. The plurality of drums 60, in the common frame 62, provides for flexibility as to the pulping capacity, while conserving floor space.

Pulping assembly 55, as shown in FIG. 1, includes two parallel sets of vertically stacked pulping drums 60, arranged in pairs, including a pair of upper drums 60a and a pair of intermediate drums 60b and a pair of lower drums 64c. The flow from the pump 50 is accordingly divided and applied equally to the inlets for the upper pair of drums 60a, for serial processing through the associated intermediate and lower drums 60b and 60c. It is obvious that more or fewer of the drums may be employed, for any given situation.

Figure 3:
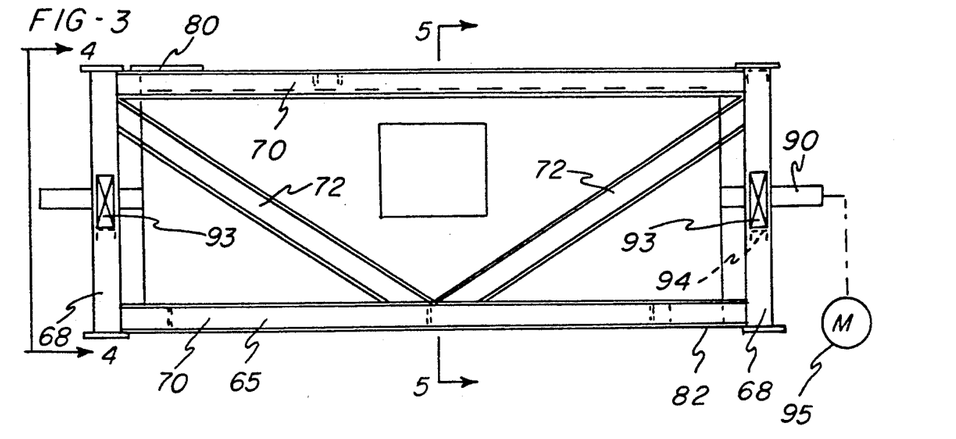
FIG. 3 is a side view of one of the drum pulping drums.
Figure 4:
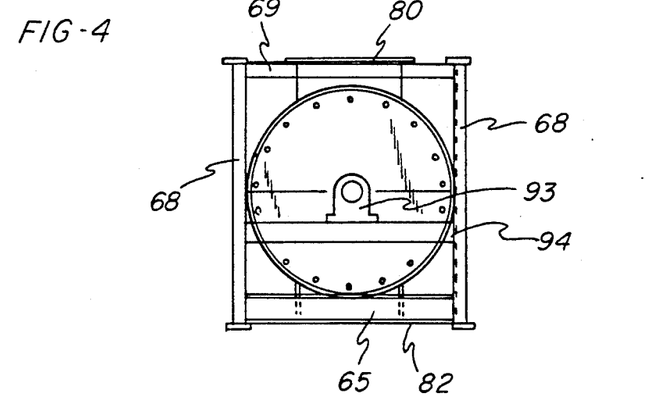
FIG. 4 is an end view of the unit of FIG. 3.
Figure 5:
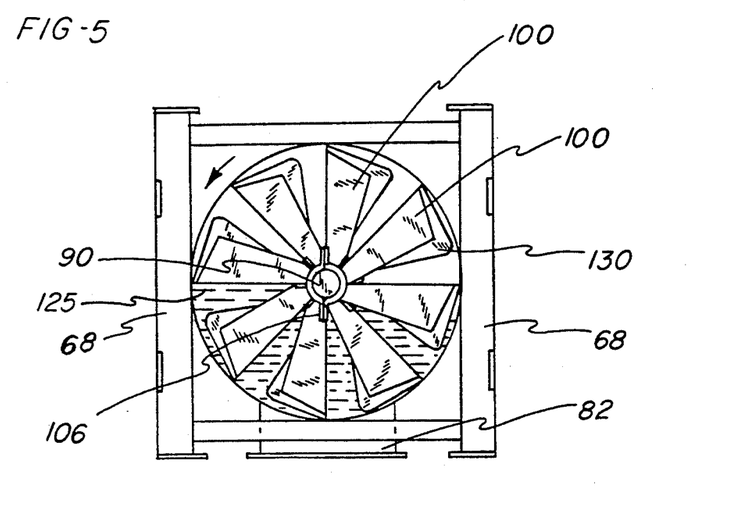
FIG. 5 is a section taken generally along the line 5—5 of FIG. 3.

All of the drums 60 are essentially identical to each other in construction, and reference may be had to the drawings of FIGS. 4 through 8 for details of construction of a preferred embodiment. Each cylindrical drum 60 is received within a subframe 65, as shown in FIGS. 3–5. The subframe 65 is formed with a pair of vertical end members 68, providing means by which the pulper drums 60 may be stacked one relative to the other. The end members 68 are connected by cross members 69 to form a box-like section on the ends. Horizontal stringers 70 extend between the vertical end members 68 and are tied with diagonal braces 72 whereby the drum 60 is captured and supported within the frame 65.

The drum 60 is cylindrical in cross-section, as viewed in FIGS. 4 and 5 and is closed at each of its ends by walls 84 and 85. Also, the drum 60 at one end is formed with an upper inlet 80 adjacent the wall 84 and a lower outlet 82 is formed adjacent the wall 85. Each of the pulping drums 60 has a shaft 90 extending axially therethrough, with sleeve bearings 91 on the ends, and with drive ends 92 extending through the wall 84 at the inlet end and through the wall 85 at the outlet end. The sleeve bearings 91 are supported in pillow-block type bearings 93 carried on a removable cross brace 94, extending between the end members 68, as shown in FIG. 4.

Figure 8:
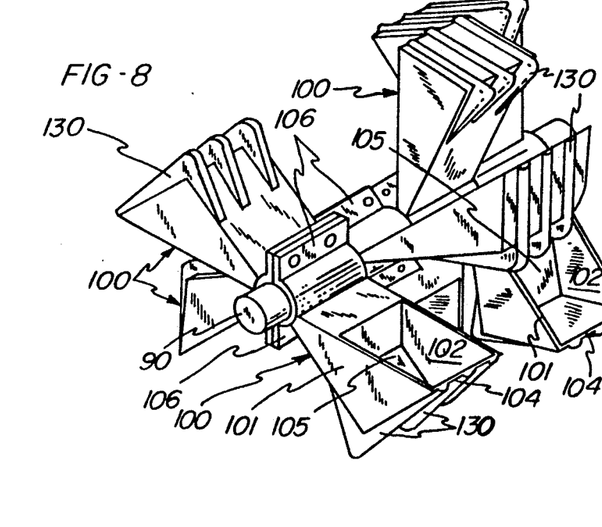
FIG. 8 is a perspective view of a fragment of the shaft showing a preferred form of the pulp buckets thereon.

The drum shafts 90 are driven by suitable motor means as diagrammatically illustrated at 95 in FIG. 3, and may be individually driven or may be connected in common or in multiples, to a common drive means. The shaft 90, for each of the drums, supports or carries thereon a plurality of generally radially extending, armlike pockets or buckets 100, as perhaps best shown in FIGS. 6 and 8. These buckets are preferably arranged in opposed pairs, as shown in FIG. 8, and are positioned or staggered along the length of the shaft 90 in angularly displaced positions one relative to the other. FIG. 8 shows a preferred arrangement in which the individual buckets are spaced at about 45° to its adjacent bucket.

The buckets are formed of sheet metal and have a pair of flat sides 101, 102, a back wall or back 103, and a spaced forward or front edge 104. The front edge extends diagonally along the sides to a bottom 105, thereby defining a bucket with a face which is open in the direction of rotation so as to scoop material up within the interior of the bucket in the upwardly turning direction, and permit the same material to fall therefrom as the bucket continues to rotate on the downward side.

Figure 6:
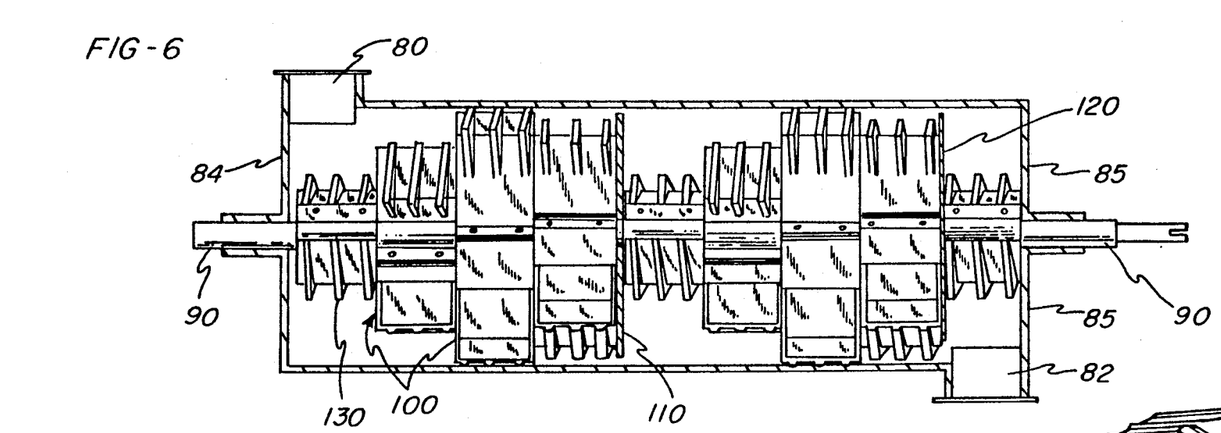
FIG. 6 is a longitudinal section through one of the pulping units.
Figure 7:
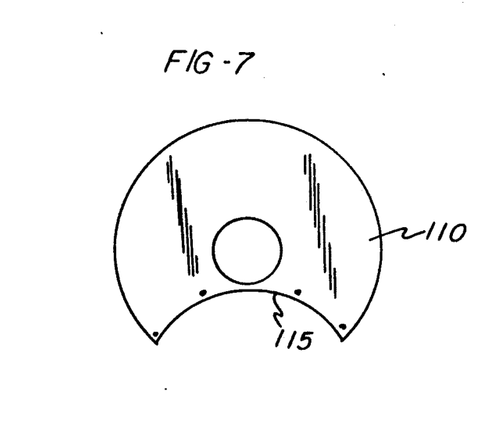
FIG. 7 is an end view of one of the flow control end plates or dams.

The inner ends of the buckets 100 are connected to shaft-receiving mounting flanges 106. Pairs of the flanges 106 are joined in opposed relation about the outer surface of the shaft 90 and are suitably bolted or riveted together to form an opposed pair of buckets. The mounting flanges or brackets are thus positioned in generally side-by-side relation along the length of the shaft 90 substantially as shown in FIG. 6.

The forward ends or edges 104 of the buckets 100 are positioned to form a relatively close fit with the inside surface of the drum so that, as the shaft is rotated, the drum interior is fully swept by the buckets. The drum interior is separated, between its ends and approximately midway the length of the interior by a first flow control baffle 110. The baffle 110 is mounted for rotation with the shaft 90 and is provided with a cut-out portion or partial opening 115, by which the rate of flow axially of the mixer may be controlled.

A second flow control baffle 120, which may be identical to the baffle 110, is positioned on the shaft in spaced relation to the end wall 85 at the outlet 82. The second baffle 120 also rotates with the shaft 90 and, like the baffle 110, is also provided with a cut-out 115. These baffles partially block the interior of the drum 60 and provide control of the rate of flow of the stock or pulp from the inlet to the outlet. The size of the cut-outs 115 may be varied to control the rate of axial flow through the drum. These baffles therefore define, in the drum, a liquid level which forms a pool 125 of the wetted accepts fraction. The pool level is preferably at or less than one-half the diameter of the drum 60 (FIG. 5).

The buckets 100 further include means by which an axial force may be imparted to the material within the drum or within the drum pool, as the shaft is rotated. For this purpose, the buckets could be set at a slight pitch or angle to the axis of the shaft 90, such as 2° or 3°, to a plane normal to the axis of rotation. However, it is preferred that the bottom surfaces 105 of the buckets be provided with rudders or vanes 130 which project from the bottom of the buckets. The vanes 130 are set at a common lead or pitch angle to a radius in relation to the shaft, and when the shaft is rotated, the vanes impart to the material within the drum an axial force or movement from the drum inlet toward the drum outlet.

When the buckets 100 are rotated into the pool 125 of stock, they scoop into the pool, fill and lift a scoop of the stock above the shaft. On the descending side the stock which had been scooped into the buckets fall out of the open face off the buckets and back into the pool. Preferably, the shafts 90 are rotated at a relatively slow speed, such as about from 15 rpm to 30 rpm. The rotating buckets dipping into the pool on the upward side and dropping their contents on the downward side, have the effect of a gentle defibering action which does not tend to break up the size of the reject stickies.

The residence time in a drum is approximately one minute for each five linear feet of drum length. When the stock reaches the outlet 82 it is gravitationally applied, from an upper drum 60a into the corresponding inlet of a series-connected drum 60b immediately therebeneath, and so forth, until the outlet of the bottom drum 65c is reached. In the example illustrated in FIG. 1, the wetted mixture from the pump 50 is divided and applied to the two top drums 60a, and so forth. When the material leaves the bottom drums 60c thorough defibering has been accomplished, thereby leaving a heterogeneous mixture of defibered stock in a water solution of relatively high consistency in the range of 8% to 15%, and disassociated stickies and other contaminants. The residency or dwell time within each of the drum units 60 may be regulated by controlling the size of the opening 115 in the baffle plates 110 and 120.

Figure 2:
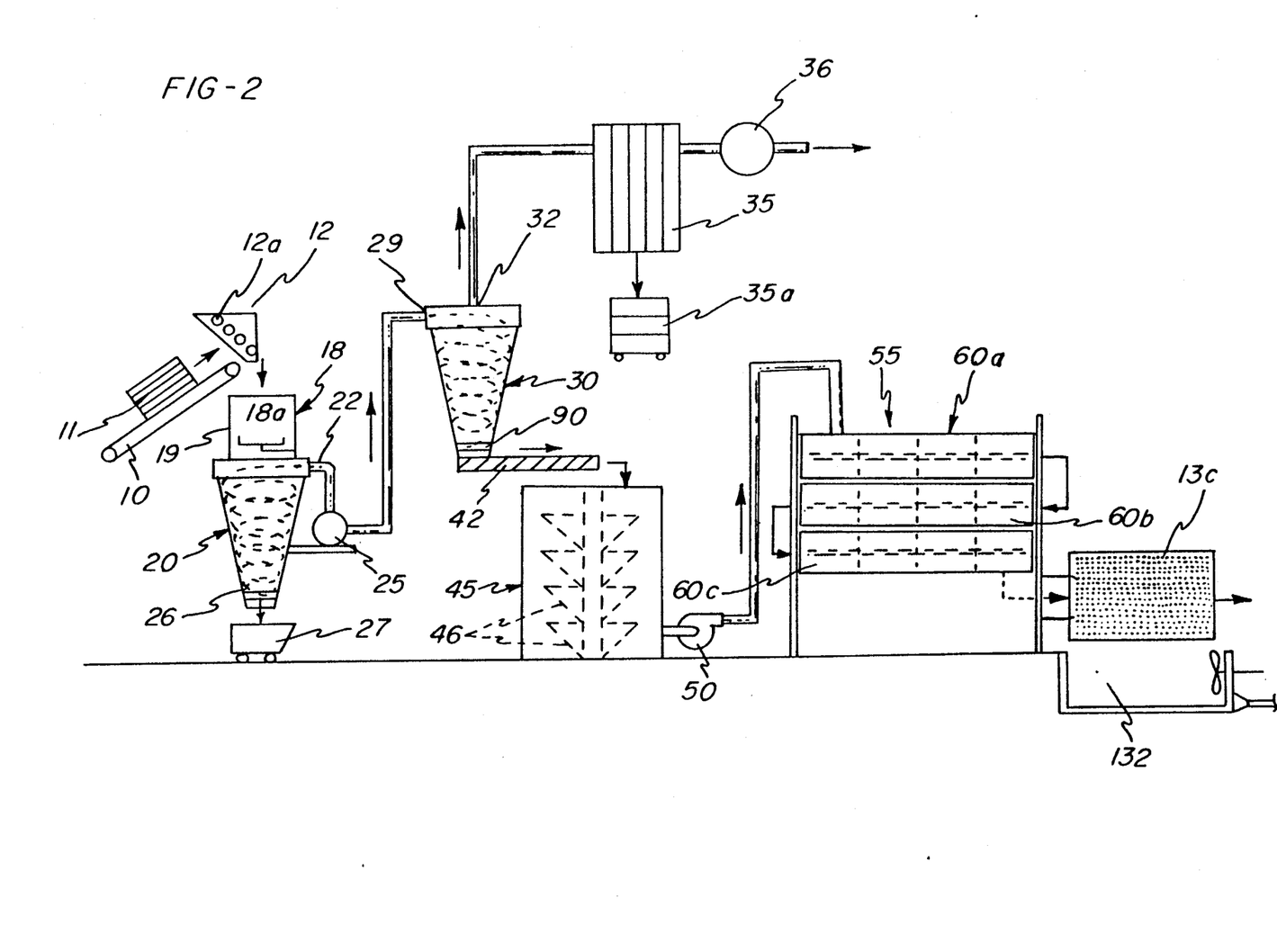
FIG. 2 is a flow diagram showing the elements of the system of FIG. 1.

The defibered and separated pulp is applied, from the lowermost drum units 60c to a screening device 130, shown in FIGS. 1 and 2 which leads the accepts into a vat 132. The screening device 130 may be a rotating separating screen sold by the Shartle Division of The Black Clawson Company under the name of "Select-Purge". The screening device 130 separates the stickies and other larger contamination pieces from the defibered stock.

The drum-type pulper assembly of the present invention has versatility in that a plurality of individual depulper drums are employed, permitting ready adjustment of capacity of the system. Further, in the event of required maintenance, a unit may be taken out of service for maintenance or repair without loosing the available capacity of the system. The air classification prior to soaking permits the separation of the lighter contaminant fraction together with the heavier contaminant fraction, thereby substantially reducing the load on the pulping apparatus and reducing the quantity of pulping liquid required.

The operation of the invention is largely evident from the foregoing description. Bales which are broken in the bale breaker 12 are carried on the conveyor 15 into the fluffer 18. Air is drawn through the first cyclone sorter 20 which has its inlet tangentially arranged on the separator 20. The heavy fraction will fall gravitationally counter to the air flow through the adjustable bottom gate 26 and into a cart 27 or the like for disposal.

A first accepts fraction, essentially free of heavies, will be applied by the dry materials blower fan 25 into the tangential inlet of a second air separator or cyclone 30, where a light fraction 32 is extracted from the axis. The remaining material, called a second accepts fraction, is now essentially free of the light fraction, as well as the heavy fraction, and is carried by the cyclone separator 30 through its lower vortex outlet into the inlet of a wetting screw 42 for delivery into the interior of the soaking tank 45. Water from a source, not shown, is applied to the tank 45 and the thoroughly wetted pulp is then applied to the uppermost drums of the drum-type pulper, as previously described.

In appropriate instances, the drum-type pulpers may be replaced by a tank-type pulper sold by The Black Clawson Company under the name "Hydrapulper." However, in some instances the drum-type pulper is preferred due to its versatility and to the gentle defibering action which separates the pulpable fibers from contaminants to which they may have been laminated or bonded, such as plastic sheeting or the like, without substantially reducing the size of the plastic pieces. Accordingly, screen separation of the pulped fibers and the stickies is enhanced and made more efficient.

While the method herein described, and the form of apparatus for carrying these methods into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A drum-type paper fiber pulper for defibering a mixture of waste paper and water, comprising:
   a cylindrical, generally horizontally extending body,
   wall means closing said body at the opposite ends thereof,
   means at one of said body ends defining an inlet,
   means at the other of said body ends defining an outlet,
   means in said body defining a liquid level and forming a pool of said mixture,
   an axial shaft extending through said body,
   a plurality of individual buckets distributed axially of said shaft between said inlet and said outlet and said buckets being fixed to said shaft and having radially thereof for rotation with said shaft and having radially outer ends terminating in close proximity to an inside surface of said body and dipping into said pool upon rotation of said shaft,
   means for rotating said shaft to cause said buckets to sweep the interior of said body and dip into said pool,
   said buckets operating to lift a scoop of such mixture from and above said pool and drop said scoop back into said pool, and
   means for causing movement of the mixture in said pool from said inlet toward said outlet.

2. A pulper according to claim 1 in which said last-named means comprises a plurality of vanes mounted on an outer surface of said buckets for imparting to said mixture an axial force tending to move said mixture from said inlet toward said outlet.

3. A drum-type paper fiber pulper for defibering a mixture of waste paper and water, comprising:
   a generally horizontally extending body having at least a generally cylindrical lower half,
   wall means closing said body at the opposite ends thereof,
   means at one of said body ends defining an inlet,
   means at the other of said body ends defining an outlet,
   means in said body defining a liquid level and forming a pool of said mixture in which said pool is confined to said body lower half,
   an axial shaft extending through said body,
   a plurality of individual buckets distributed axially of said shaft between said inlet and said outlet and said buckets being fixed to said shaft and extending radially thereof for rotation with said shaft and having radially outer ends terminating in close proximity to an inside surface of said body and dipping into said pool upon rotation of said shaft,
   means for rotating said shaft to cause said buckets to sweep the interior of said body and dip into said pool,
   said buckets operating to lift a scoop of such mixture from and above said pool and drop said scoop back into said pool, and
   said buckets having means thereon interacting with said mixture in said pond and controlling the rate of movement of said mixture therein between said inlet and said outlet, causing movement of the mixture in said pool from said inlet toward said outlet.

* * * * *

UNITED STATES PATENT AND TRADEMARK OFFICE
CERTIFICATE OF CORRECTION

PATENT NO. : 5,324,389
DATED : June 28, 1994
INVENTOR(S) : Mark W. Spencer

It is certified that error appears in the above-indentified patent and that said Letters Patent is hereby corrected as shown below:

Col. 10, line 9, "having" should be -- extending --.

Signed and Sealed this

Sixth Day of September, 1994

Attest:

BRUCE LEHMAN

*Attesting Officer*  *Commissioner of Patents and Trademarks*